Patented Jan. 3, 1950

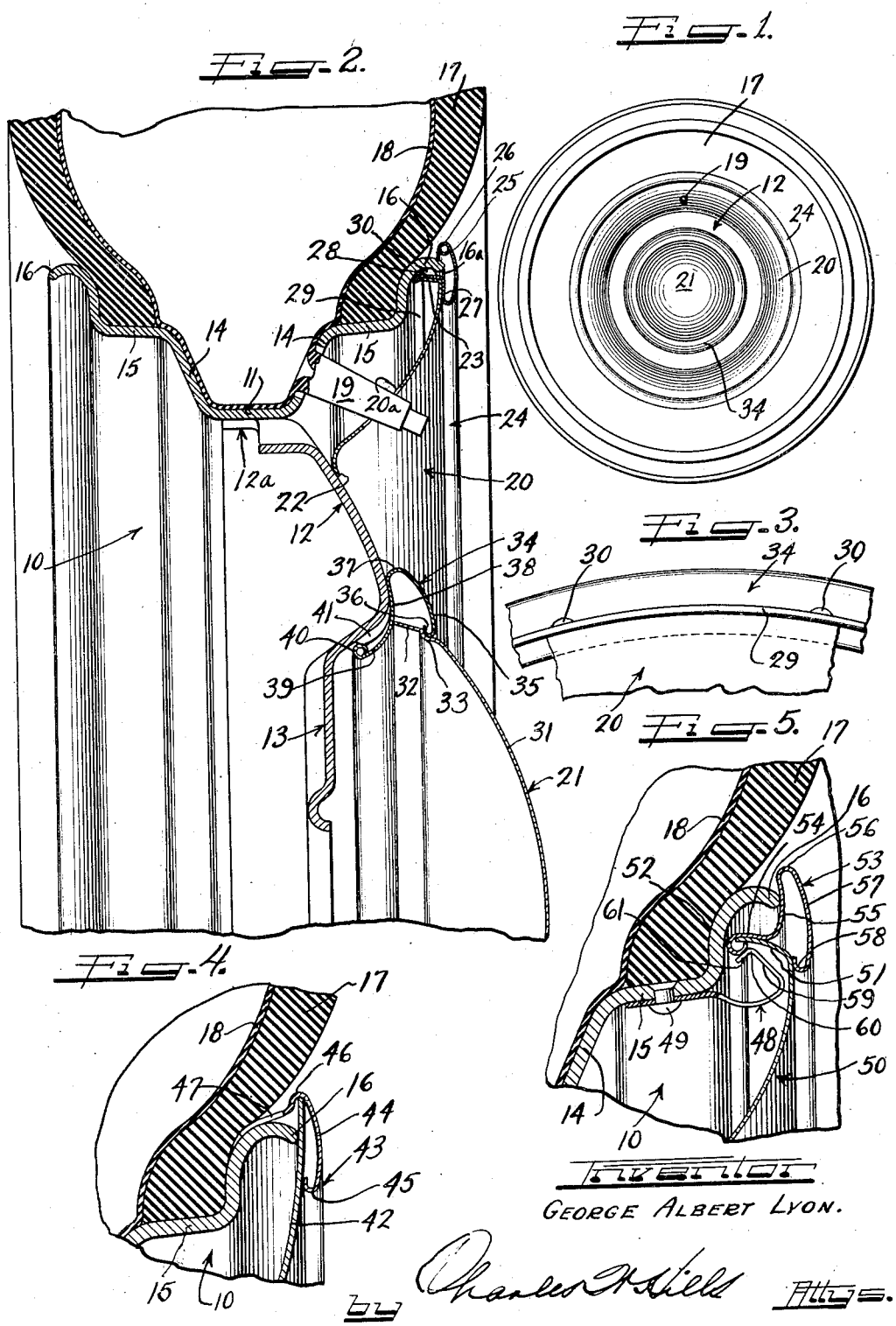

2,493,001

UNITED STATES PATENT OFFICE 2,493,001

WHEEL COVER

George Albert Lyon, Allenhurst, N. J.

Application December 22, 1943, Serial No. 515,205

10 Claims. (Cl. 301—37)

This invention relates to an improved wheel structure and is directed more particularly to an improved cover assembly therefor.

It is an important object of the present invention to provide improved retaining means for maintaining a cover assembly over the outer side of a wheel structure.

Still another important object of the present invention is to provide for a cover member formed from relatively breakable material such as sheet synthetic plastic or the like, a relatively rigid retaining member for securing the same to the outer side of a wheel structure, said retaining member being formed preferably from a relatively rigid material such as sheet stainless steel and also serving to rigidify and overlie and ornament the radially outer margin of the plastic cover member, this retaining member preferably being in the form of an annulus and having an axially inwardly extending part arranged for detachable engagement with a portion of the wheel.

It is still another object of the present invention to provide an improved retaining, rigidifying, ornamental member for a cover, said member being in the form of an annulus and being secured to the cover member in such a manner that a multi-part, unitary structure is provided.

In accordance with the general features of the present invention there is provided herein a circular cover member formed from sheet synthetic plastic material or the like, whereby it is self-sustaining as to form and yet is resiliently, locally flexible so that it immediately snaps back into initial configuration when distorting pressures are relieved therefrom, said cover being provided at the radially outer margin thereof with a circular, reinforcing, ornamenting attachment member formed from sheet stainless steel or the like, said retaining member including a portion disposed radially relative to the circular cover and extending radially outwardly beyond the periphery thereof and also including a part arranged to retainingly receive the outer margin of the cover to provide a unitary structure, said retaining member also including a generally axially, inwardly extending, resilient snap-on portion arranged to fit into a shouldered or reentrant portion of the wheel, thereby to maintain the cover assembly thereon in detachable relationship thereto.

In accordance with other features of the present invention there is provided herein a cover assembly including a circular cover member formed from sheet synthetic plastic material or the like whereby it is self-sustaining as to form and yet is locally, temporarily, resiliently flexible whereby it will immediately snap back into normal configuration when distorting pressures are relieved therefrom, said cover also being provided with a radial cross-section of such shape and expanse that it generally simulates the shape of a side wall of a tire in the wheel, thereby to give the appearance of being a continuation thereof and extends radially inwardly from substantially the radially outer extremity of a tire rim of a wheel, to a point on the central load bearing portion of the wheel, said cover also being provided with a retaining, ornamenting, rigidifying member at the radially outer edge thereof, said rigidifying member being preferably formed from stainless sheet steel or the like and including an axially outwardly exposed ornamental part, a part for retainingly receiving the radially outer margin of the cover and a part for retainingly engaging resilient spring clips secured to the wheel and extending generally axially outwardly therefrom.

Many other objects and advantages of the invention will become apparent from the following description and accompanying drawings, in which:

Figure 1 is a side elevational view of a wheel embodying one form of my invention;

Figure 2 is a fragmentary, enlarged, radially cross-sectional view of the wheel structure shown in Figure 1;

Figure 3 is an enlarged, fragmentary, rear elevational view looking axially outwardly of a portion of the junction between the cover of Figure 2 and the retaining annulus therefor;

Figure 4 is an enlarged, fragmentary, radially cross-sectional view of a wheel structure embodying a modified form of my invention; and Figure 5 is is an enlarged, fragmentary, radially cross-sectional view of a wheel structure embodying a still further modified form of my invention.

It will be understood that the embodiments shown herein are for illustrative purposes only and may be changed or modified without departing from the spirit and scope of the invention as set forth in the appended claims.

In the various embodiments herein the wheel structure shown is identical and accordingly similar parts will be identified by similar numerals.

As best shown in Figure 2 the wheel structure shown herein includes a tire rim 10 of the flanged, drop center type having a base flange 11 which may be secured as by welding or riveting or the like to an axially inwardly extending peripheral skirt or flange 12a of a central load bearing portion 12 of the wheel.

The central load bearing portion 12 is further provided with an annular, radially inward bolt-on flange 13 while the tire rim 10 is further provided with opposite side wall flanges 14, opposite intermediate flanges 15 and opposite edge portions 16, between which may be disposed the beads of a tire 17 having an inner tube 18 provided with a valve stem 19 which extends through an aligned aperture in the respective side wall 14, thereby to be available for inflation of the tire.

In the constructions of Figures 1 and 2 the cover assembly includes a radially outer annular portion 20 and a central circular hub cap simulating portion 21. The radially outer annular portion 20 is preferably provided with a cross-sectional configuration whereby it substantially simulates the curvature of the side wall of the tire 17 to give the appearance of being a part therof and to appear as a white side wall of a massive tire mounted on a wheel structure of minimum dimensions when colored white. This cover member 20 is further provided with a cross-sectional expanse whereby it extends from the vicinity of the edge portion 16 of the tire rim 10 radially inwardly to a point on the central load bearing portion 12 disposed radially inwardly of the junction between the tire rim 10 and the load bearing portion 12. In this manner it will be seen that the unsightly junction between the wheel parts 10 and 12 and the outer surfaces of flanges 14, 15 and 16 of the tire rim will be entirely concealed.

Preferably the cover member 20 is provided with an aperture 20a through which the outer end of the valve stem 19 may extend to be accessible for application of the nozzle of an air hose for inflation of the tire. This cover member 20 is also provided at the radially inner edge thereof with an outwardly turned flange 22 which may be disposed in substantial surface engagement with the adjacent portion of the outer surface of the central load bearing portion 12, thereby to serve as a radially inner support for the cover member.

The cover member 20 is further provided at the radially outer margin thereof with a generally axially inwardly extending flange 23 which describes a circle having a diameter somewhat smaller than that described by the extreme, inwardly turned terminal edge 16a of the edge portion 16 of the tire rim.

In order that the cover member 20 which, as indicated previously, is formed from sheet synthetic plastic material and is thus relatively breakable, may be rigidified and reinforced at the radially outer edge thereof and furthermore, in order that the junction thereof with the edge portion 16 may be concealed and the cover may be detachably secured to the wheel structure there is provided a reinforcing, ornamental, rigidifying annulus 24 which is preferably formed from stainless sheet steel or the like.

The annulus 24 has an axially outwardly extending portion 25 terminating radially outwardly in a rigidifying bead 26, the portion 25 comprising generally a radially outwardly convex surface of such radial expanse that it bridges the space between the flange 23 of the cover 20 and the edge portion 16 of the tire rim.

As shown in Fig. 2 the portion 25 of the annulus 24 extends radially inwardly and then is bent back upon itself to form a flange 27 which is arranged to be disposed in surface abutment with the radially outer margin of the radially outwardly extending part of the cover 20. The flange 27 terminates in a flange 28 which extends axially inwardly and terminates in a bent back portion 29 which is arranged to envelop the axially inner edge of the flange 23 of the cover member 20, thereby to secure the parts 20 and 24 together.

As indicated previously, the edge portion 16 of the tire rim 10 curves slightly radially inwardly as at 16a and to the end that the flange 28 of the annulus 24 may be detachably secured to the wheel structure by nested engagement within the radially inner surface of the edge portion 16 of the tire rim 10, this flange is provided with a plurality of radially outwardly extending, circularly aligned, circumferentially spaced bumps 30. In such a construction it will be seen that the composite flange made up of flanges 23 and 28 extends axially inwardly of the cover parts and is slightly axially, resiliently flexible whereby the peaks of the bumps 30 will be urged radially inwardly to a slight degree as they pass axially inwardly of the portions 16a of the wheel tire rim 10, whereupon the flanges will urge the bumps radially outwardly into the position shown in Fig. 2, whereby a detachable, secure interlocking relationship is obtained between the cover assembly and the wheel.

Such a construction affords relatively rigid, nonbreakable reinforcement at the radially outer part of the circular cover, this part being ordinarily vulnerable when the vehicle is driven against curbing or the like.

In order to remove the cover assembly from the wheel the operator need merely extend the fingers behind a portion of the bead 26 and draw the same outwardly, whereupon the adjacent portion of the axially inwardly extending flange with the bumps 30 thereof will be flexed radially inwardly to permit axial outward movement thereof, and then progressive removal of the remainder of the flange and the bumps 30 thereof may be effected to detach the same entirely from the wheel.

In the construction of Figure 2, it will be understood that the cover member 20 may be extended centrally to constitute a single integral circular cover member or, if desired, a separate central cover assembly such as that shown at 21 may be provided.

The central hub cap simulating cover member 21 which also may be formed from synthetic sheet plastic material includes the crowned portion 31 and a generally axially inwardly extending peripheral flange 32, the junction of the parts 31 and 32 comprising a circular generally radially outwardly opening grooved portion 33.

To the end that the radially outer part of the cover member 21 may be ornamented and rigidified and in order that said cover part may be secured to the wheel structure in detachable relationship thereto, there is provided an annular rigidifying, ornamenting, retaining member 34 for securing the same to the wheel structure. This annular member 34 includes a generally radially extending, axially outwardly convex annular body portion 35, the radially inner edge thereof being curled axially inwardly and preferably radially outwardly as at 36 to present a smooth round surface to the portion of the cover 21 which is engaged thereby, namely, the grooved portion 33. The convex annular portion 35 of the retaining member 34 terminates at the radially outer part thereof in an axially inwardly, radially inwardly curved part 37 which merges with a generally radially inwardly extending flange 38, the latter in turn terminating in a generally axially inwardly extending resilient snap-on flange 39 which is provided with a peripheral snap-on bead 40. As will be seen from Figure 2, the adjacent portion of the central part of the body portion 12 of the wheel is provided with a plurality of circularly aligned, circumferentially spaced, generally radially inwardly facing humps 41 which provide the desired cam surfaces over which the snap-on bead 40 may be urged to retainingly engage, in detachable relationship, the central cover assembly. It will be understood that the retention of the cover member 21 in its respective annulus 34 is obtained first by the engagement of the curled portion 36 of the retaining member in the groove 33 of the cover member and also by the relative radially outward disposal of the circular flange 32 thereof within the retaining member, the edge of the flange 32 preferably abutting the adjacent portion of the axially inner part of the retaining member.

In order to remove the central cover assembly from the wheel, it will be seen that the operator need merely insert the point of a pry-off tool behind the curved portion 37 of the retaining member 34, whereupon the adjacent part of the snap-on flange 40 is drawn axially outwardly out of engagement with the respective humps 41. Thereafter the remainder of the snap-on bead 40 may be progressively removed from the humps.

In the modified construction of Figure 4 it will be seen that the plastic cover member 42 extends radially outwardly slightly beyond the edge portion 16 of the tire rim, while the retaining, ornamenting, rigidifying annulus 43 includes an axially outwardly convex portion 44 which serves as a border ornament bead for the cover. This portion 44 terminates at the radially inner side in a curled portion 45 to present a smooth surface to the adjacent portion of the cover and terminates at the radially outer part thereof in a curled portion 46 which substantially envelops the outer edge of the cover member 42 and terminates in radially inwardly extending fingers 47 which overlie the radially outer surface of the edge portion 16 of the tire rim to be sandwiched between that surface and the adjacent portion of the surface of the side wall of the tire 17 when mounted in the tire rim. Thus, in this construction the tire itself aids in maintaining the cover assembly on the wheel structure.

It will also be seen that in view of the circular, radially inwardly opening groove afforded by the portion 46 of the retaining member, the cover assembly of Figure 4 is a multi-part, unitary structure in which the parts are normally secured together and may be removed from and attached to the wheel together.

In the construction of Figure 5 the assembly is somewhat similar to that shown in Figure 2 except that the bumps are not here necessary since the axially inwardly extending flange may be secured to axially outwardly extending spring clips 48 which are secured to the tire rim 10 as at the intermediate flange 15 by means of rivets 49. In this construction the plastic circular cover member 50 having the attributes of the cover members shown in Figures 1, 2, 3 and 4 is provided with a generally axially inwardly extending peripheral flange 51, the axially inner edge of which is enveloped by a snap-on bead 52 of a rigidifying, ornamenting, retaining bead 53 which may be formed from relatively rigid material such as sheet stainless steel or the like, whereby, as in the previous constructions, a high luster may be given thereto to enhance the ornamental appearance of the entire assembly. The snap-on bead 52 serves as the peripheral border for a relatively resilient snap-on flange 54 which in turn merges with a radially outwardly extending circular flange 55. The flange 55 in turn merges into an axially outwardly curved portion 56 which in turn serves as the radially outer border of an axially outwardly convex body portion 57 of the retaining, ornamental annulus 53. As will be seen from Figure 5, the radially inner margin of the portion 57 of the retaining member 53 is curved axially inwardly and radially outwardly to present a smooth surface to the adjacent portion of the outer surface of the cover member 50.

As in the construction of Figures 1, 2 and 3, the retaining member 57 may be permanently secured to the cover member 50 by means of a rolling operation, whereby the bead 52 is formed prior to the application of the cover assembly to the wheel.

After this forming operation has been accomplished, it is merely necessary to align the cover assembly concentrically with the wheel structure and to force the same axially inwardly, whereby the snap-on bead rides up the cam surface of the portion 59 of the resilient spring clips 48 until it passes over the peak 60 which serves as a junction between the portion 59 and the cam surface 61 of the respective clips, whereupon the clips, which have been urged radially inwardly to a slight degree snap radially outwardly to provide the association shown in Figure 5.

In order to remove the structure of Figure 5 from the wheel it will be seen that the operator need merely apply finger pressure behind the curved portion 56 of the retaining member 53 and draw the same axially outwardly whereupon the snap-on bead 52 will be drawn over the peaks 60 of the respective spring clips 48 to be released from the wheel.

From the foregoing it will be seen that there is provided herein a novel retaining arrangement for securing a multi-part cover assembly to a wheel structure in detachable relationship thereto, the cover assembly including a circular, relatively breakable part made from sheet synthetic plastic material or the like, and an annular retaining, ornamenting, rigidifying member disposed at the radially outer margin of the cover member, the assembly including an axially inwardly extending part arranged for detachable engagement with a portion of the wheel.

I claim as follows:

1. In a wheel structure including a tire rim and a central load bearing portion, a cover assembly including a circular cover member formed from sheet synthetic plastic material and having a cross-sectional configuration and expanse whereby it may be disposed over the outer side of a wheel structure to conceal the flanges of the tire rim and whereby it may extend radially inwardly beyond the junction of the tire rim and the central load bearing portion, said cover part having a generally axially inwardly extending, radially outer marginal flange portion, and a rigidifying, ornamenting, retaining annulus secured to said cover part, said annulus including a generally axially, inwardly extending flange portion arranged for interlocking engagement with said outer marginal portion of said cover part and also including a generally radially extending portion terminating in a reversely extending outer portion, said last named portion being arranged to extend over and conceal the junction between the annulus and the cover part, and means on the axially inwardly extending interlocked flange portions of said annular retaining annulus and said cover for detachably engaging a portion of the wheel over which the cover assembly is disposed.

2. In a wheel structure including a flanged tire rim of the drop center type and a central load bearing portion, said rim including an edge portion terminating in a part extending generally axially outwardly and curved slightly radially inwardly, a cover assembly including a circular cover part arranged to extend substantially over the outer side of said flanges of the tire rim to conceal the same and an annular, retaining, rigidifying member arranged to extend radially over the outer marginal portion of the cover part to conceal the same, said cover part having a generally axially inwardly extending marginal flange disposed slightly radially inwardly of the axially outwardly extending portion of the edge portion of the tire rim and said retaining member also including a generally axially inwardly extending flange arranged for interlocking relationship with the flange of said cover part, said flange of the retaining member being provided with radially outwardly extending protuberances for resilient detachable engagement with the radially inner surface of said edge portion of the tire rim and terminating in a radially extending part which in turn merges into a reversely extending radial, axially outwardly exposed portion, said axially outwardly exposed portion having a radial expanse whereby it extends radially outwardly over the junction of the flanges and beyond edge portion of the tire rim to conceal the same.

3. In a wheel structure including a flanged tire rim and a central load bearing portion there being axially outwardly extending resilient spring clip members mounted on a flange of said tire rim, a cover assembly including a circular cover part formed from sheet synthetic plastic material and having a generally axially inwardly extending marginal flange portion and a rigidifying annular retaining member for said cover part, said annular member including a generally axially inwardly extending circular flange having an edge curled around the peripheral edge of the flange of the cover part to provide a snap-on bead for engagement with said spring clips on the wheel structure, said retaining member including a radially outwardly extending portion having a cross-sectional expanse whereby it extends radially outwardly of the edge portion of the tire rim and in turn including a reversely bent, radially inwardly extending, axially outwardly exposed ornamental portion extending radially inwardly of the junction between the cover and the retaining member.

4. In a wheel structure including a flanged tire rim and a central load bearing portion, there being cover retaining means on said tire rim, a cover assembly including a circular cover part formed from sheet synthetic plastic material and having a generally axially inwardly extending radially outer marginal flange portion, and a rigidifying annular retaining member for said cover part, said annular retaining member including a generally axially inwardly extending circular flange having its inner edge turned into encompassing relation to the peripheral edge of the flange of the cover part to provide a snap-on bead structure for engagement with said retaining means on the tire rim, said retaining member including a radially outwardly extending portion having a cross-sectional expanse whereby it extends radially outwardly of the edge portion of the tire rim, and in turn including a reversely bent, radially inwardly extending, axially outwardly exposed ornamental portion extending radially inwardly of the junction between the cover and the retaining member.

5. In a cover assembly for a wheel including a tire rim and a central load bearing portion, a cover member formed from sheet material and having a radial expanse to extend from the tire rim to the load bearing portion in concealing relation to the juncture between the rim and load bearing portion, and an annular protective and retaining member for the outer marginal portion of said cover member formed from sheet metal and including a generally radially extending axially outer ornamental and protective portion dimensioned to overlie said outer marginal portion of the cover member and turned under and radially inwardly from its outer margin and then turned generally axially inwardly to provide a flange portion for attaching the cover assembly to a wheel, the marginal portion of said cover member being retainingly engaged by the annulus between said flange portion and said axially outer ornamental and protective portion, the inner margin of the annular member overlying the cover member.

6. In a cover assembly for a wheel including a tire rim and a central load bearing portion, a cover member formed from sheet material and having a radial expanse to extend from the tire rim to the load bearing portion in concealing relation to the juncture between the rim and load bearing portion, and an annular protective and retaining member for the outer marginal portion of said cover member comprising a sheet metal annulus having an axially outer side portion extending generally radially and dimensioned to overlie said marginal portion of the cover member, said portion of the annular member having at one margin an underturned generally radially extending portion including a generally axially extending flange portion concealed behind the axially outer portion of the annular member, said outer marginal portion of the cover member including a generally axially extending flange bearing against the radially inner side of said axial flange of the annular member and retained in assembly by the axially inner extremity of said flange of the annular member turned upon itself to the radially inner side of such flange.

7. In a wheel cover structure, an annulus adapted to be assembled with the outer margin of a cover member, said annulus including a generally axially outwardly facing ornamental and protective portion and including a rearward reversely turned generally radially extending portion at one margin of the axially facing portion, there being a generally axially inwardly extending flange projecting from said radially extending portion fully concealed behind said axially facing portion and constructed and arranged for attachment to a wheel, said flange including radially outwardly extending integral retaining protrusions.

8. In a cover assembly for disposition at the outer side of a vehicle wheel, a circular cover member formed from sheet material, and a circular protective and retaining member marginally overlying said cover member and formed from sheet material, said protective and retaining member including a generally radially extending outer ornamental and protective portion which overlies the cover member marginally and also including an underturned generally radially extending flange portion behind said outer portion, said flange portion having the inner terminal extent thereof turned generally axially inwardly to provide a flange portion for attaching the cover assembly to the wheel, the marginal portion of said cover member being retainingly engaged by said protective and retaining member between said attaching flange portion and said outer ornamental and protective portion.

9. In combination in a cover assembly for disposition at the outer side of a vehicle wheel, a circular cover member formed from sheet material and having an outer marginal flange portion extending generally axially inwardly, and a protective and retaining annulus overlying said marginal portion of the cover member to a substantial extent radially inwardly of said marginal flange and also projecting radially outwardly beyond said flange, said annulus having an outer ornamental and protective portion extending generally radially, and an underturned portion at its inner margin extending generally radially outwardly behind said ornamental and protective portion and having a generally axially inwardly extending attachment flange portion against which said marginal flange of the cover member is retainingly in abutment, said attachment flange portion having radially outwardly extending means for retaining engagement with a part on the wheel.

10. In combination in a cover assembly for disposition at the outer side of a vehicle wheel, a circular cover member formed from sheet material and having an outer marginal flange extending generally axially inwardly, and a retaining and ornamental annulus having an ornamental and protective portion extending generally radially and dimensioned to overlie the marginal portion of the cover member and extending radially substantially therebeyond, the outer marginal portion of said annulus being turned under radially inwardly behind the ornamental and protective portion and having a generally axially inwardly extending terminal flange portion against the radially inner side of which said marginal flange of the cover member is retainingly assembled, the edge of the terminal flange portion being turned upon itself into encompassing relation to the edge of the marginal cover flange.

GEORGE ALBERT LYON.

REFERENCES CITED

The following references are of record in the file of this patent:

UNITED STATES PATENTS

| Number | Name | Date |
|---|---|---|
| Re. 22,410 | Lyon | Dec. 21, 1943 |
| 1,234,387 | Pugh | July 24, 1917 |
| 2,101,318 | Lyon | Dec. 7, 1937 |
| 2,135,757 | Lyon | Nov. 8, 1938 |
| 2,157,136 | Lyon | May 9, 1939 |
| 2,158,125 | Horn | May 16, 1939 |
| 2,190,669 | Lyon | Feb. 20, 1940 |
| 2,316,346 | Lyon | Apr. 13, 1943 |